United States Patent
Deshmukh et al.

(10) Patent No.: US 12,413,652 B2
(45) Date of Patent: Sep. 9, 2025

(54) METHOD FOR IDENTIFYING AND MANAGING QUIC CONNECTIONS FOR MIDDLEBOXES

(71) Applicant: Cisco Technology, Inc., San Jose, CA (US)

(72) Inventors: Rajvardhan Somraj Deshmukh, San Jose, CA (US); Nancy Patricia Cam-Winget, Mountain View, CA (US); James W. Kasper, Leander, TX (US)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 17/973,115

(22) Filed: Oct. 25, 2022

(65) Prior Publication Data

US 2024/0137428 A1 Apr. 25, 2024
US 2024/0236210 A9 Jul. 11, 2024

(51) Int. Cl.
*H04L 69/16* (2022.01)
*H04L 9/40* (2022.01)
*H04L 45/02* (2022.01)

(52) U.S. Cl.
CPC ............. *H04L 69/16* (2013.01); *H04L 45/02* (2013.01); *H04L 63/0236* (2013.01)

(58) Field of Classification Search
None
See application file for complete search history.

(56) References Cited

U.S. PATENT DOCUMENTS

| 8,224,966 B2 * | 7/2012 | Tate | H04L 69/16 |
| | | | 709/227 |
| 11,533,655 B2 * | 12/2022 | Sarker | H04L 69/164 |

(Continued)

FOREIGN PATENT DOCUMENTS

| EP | 3754947 A1 * | 12/2020 | ........... H04L 43/026 |
| EP | 3754947 B1 | 5/2023 | |
| WO | WO-2020043319 A1 * | 3/2020 | ............. H04L 67/22 |

OTHER PUBLICATIONS

The PCT Search Report and Written Opinion mailed Feb. 13, 2024 for PCT Application No. PCT/US2023/035896 from PCT Summary, 32 pages.

(Continued)

*Primary Examiner* — Natisha D Cox
(74) *Attorney, Agent, or Firm* — Lee & Hayes, P.C.

(57) ABSTRACT

Techniques are described for managing QUIC connections. The techniques include identifying a first QUIC connection between a first and second device. Determining, from the connection, a first IP address and port number of the first device, a second IP address and port number of the second device, and a first CID. Storing an association between the first and second IP addresses, port numbers and first CID. Identifying a second QUIC connection between the first device and another device. Identifying, from the second connection, the first IP address and port number, a second CID, and a third IP address and port number. Determining if two of the following are met: the second IP address corresponds to the third IP address, the second port number corresponds to the third port number, the second CID corresponds to the first CID, if two are met, the first and second QUIC connections are the same.

20 Claims, 11 Drawing Sheets

(56) References Cited

U.S. PATENT DOCUMENTS

| | | |
|---|---|---|
| 2019/0116535 A1 | 4/2019 | Szilagyi et al. |
| 2020/0120015 A1 | 4/2020 | Boucadair et al. |
| 2021/0045186 A1 | 2/2021 | Fu et al. |
| 2021/0211385 A1 | 7/2021 | Gochi Garcia et al. |
| 2021/0329069 A1 | 10/2021 | Desmouceaux |
| 2021/0409447 A1 | 12/2021 | Dutta |
| 2022/0191304 A1* | 6/2022 | Jain .................. H04L 67/34 |

OTHER PUBLICATIONS

Duke Google N Banks Microsoft C Huitemaprivate Octopus Inc M: "QUIC-LB:Generating Routable QUIC Connection IDsdraft-ietf-quic-load-balancers-15;draft-ietf-quic-load-balancers-15.txt",QUIC-LB:Generating Routable Quicconnection idsdraft-ietf-quic-load-balancers-15;draft-ietf-quic-load-balancers-15.txt;Internet-Draft: QUIC, Internet Engineeringtask Force, IETF; Standardworkingd URL:https://tools.ietf.org/html/draft-ietf-quic-load-balancers-15[retrieved on Oct. 24, 2022] 42 pages.

Kuehlewind Ericsson B Trammell Google M: "Manageability of the QUIC TransportProtocol draft-ietf-quic-manageability-10;draft-ietf-quic-manageability-10.txt", Manageability of the Quic Transportprotocol draft-ietf-quicmanageability-10;draft-ietf-quic-manageability-10.txt;internet-Draft: Network Working Group,Internet Engineering Task Force, IETF;Stand<URL;https//tool.ietf.org/hml,draftiietf-quic-managebility-10, 32 pages.

\* cited by examiner

METHOD FOR IDENTIFYING AND MANAGING QUIC CONNECTIONS FOR MIDDLEBOXES

TECHNICAL FIELD

The present disclosure relates generally to identifying, tracking, and managing QUIC connections when their IP addresses, ports numbers, or connection ID's change.

BACKGROUND

QUIC is a transport on top of user datagram protocol UDP and the only transport for HTTP3 which is rapidly gaining adoption. QUIC is gaining popularity by becoming the default choice for streaming and data transfer over the web because it can offer security while also working incredibly fast. QUIC improves security of network traffic packets significantly because the packets are tamper proof and not easily visible by network equipment, even basic sniffing on handshake packets are disabled by different layers of protection. However, because QUIC is an encryption-based protocol, the ability to inspect metadata currently used by visibility, network, and security solutions is extremely prohibitive, thus, creating a new problem. Network providers cannot use traditional traffic management tools to identify, track, and manage QUIC connections because only the end application (client) and application host (server) can keep track of the "connection". This poses a problem for middlebox solutions, as the ability to track distinct QUIC connections is extremely difficult to nearly impossible using conventional techniques since in order to affect control policies for all traffic, policies must be mapped to connections. Thus, when an IP address, port number, or connection identifier (CID) for a QUIC connection changes, it is extremely difficult for a middlebox to determine that the QUIC connection is the same connection.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
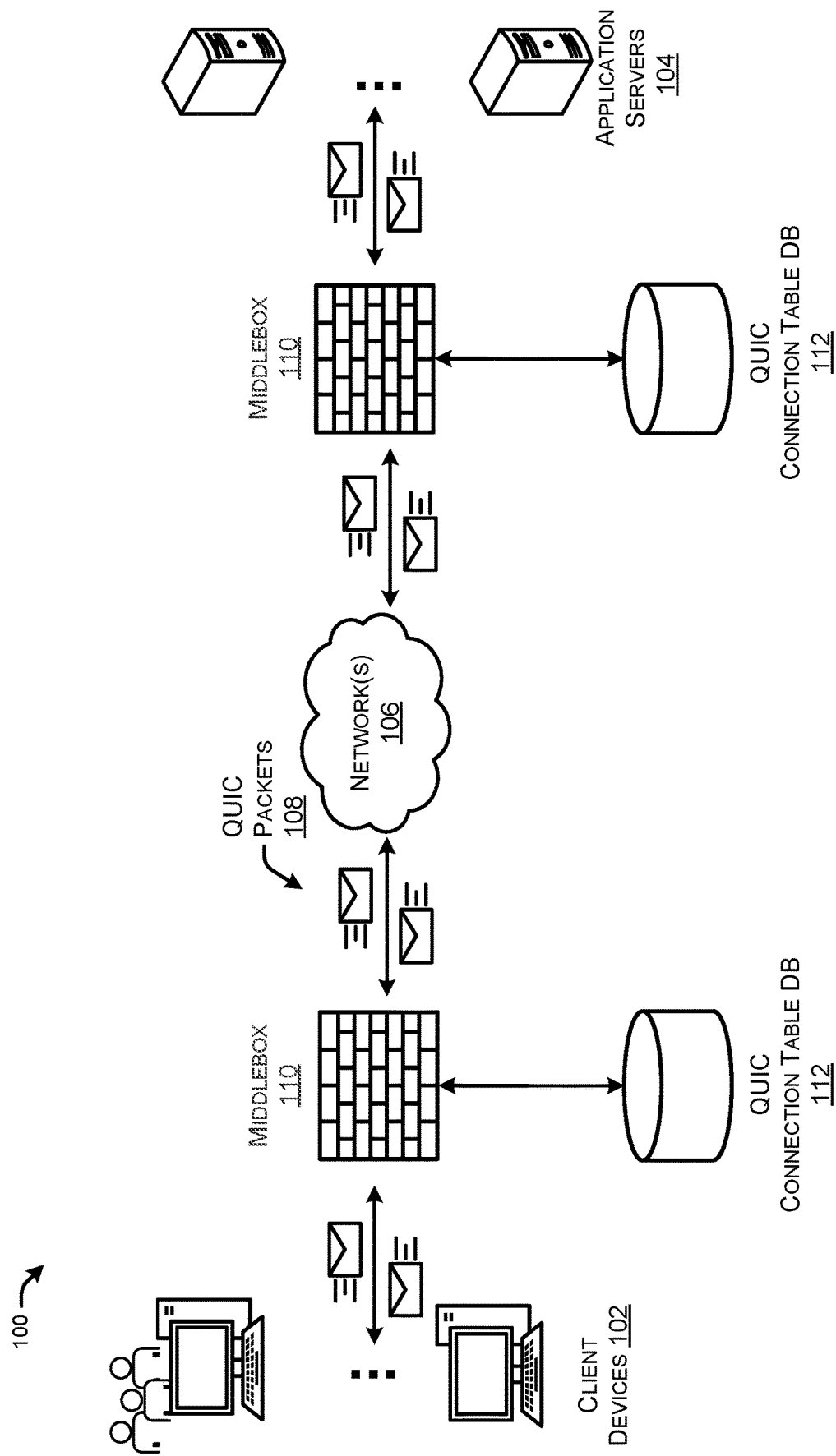
FIG. 1 is a partial system-architecture diagram of an example environment for identifying, tracking, and managing QUIC connections.

This disclosure describes techniques for identifying, tracking, and managing QUIC connections when an IP address, port connection, or CID changes. A method to perform techniques described herein includes identifying, by a network device, a first QUIC connection between a first device and a second device. The method may also include determining, from the first QUIC connection, a first IP-tuple including a first IP address and a first port number associated with the first device. Additionally, the method may include, determining, from the first QUIC connection, a second IP-tuple including a second IP address and a second port number associated with the second device. Also, the method may include determining, from the first QUIC connection, a first connection identifier (CID) associated with the first QUIC connection. A first association between the first IP-tuple, the second IP-tuple, and a first connection identifier (CID) associated with the first QUIC connection may be stored. Further, the method may include identifying, by the network device, a second QUIC connection between the first device and another device. The method may also include identifying, from the second QUIC connection, the first IP-tuple, a second CID, and a third IP-tuple including a third IP address and a third port number. Also, the method may include determining whether at least two of the following connection criteria are met: 1) the second IP address corresponds to the third IP address, 2) the second port number corresponds to the third port number, or 3) the second CID corresponds to the first CID. Finally, in response to determining that at least two of the connection criteria are met, the method may include determining that the second QUIC connection corresponds to the first QUIC connection and updating the first association based at least in part on the third IP-tuple or the second CID.

Additionally, the techniques described herein may be performed by a system and/or device having non-transitory computer-readable media storing computer-executable instructions that, when executed by one or more processors, performs the method described above.

Example Embodiments

Connection migration allows QUIC end points to migrate connections to different IP addresses and network paths. For instance, a mobile device can migrate QUIC connections between a cellular network and Wi-Fi when a known Wi-Fi network becomes available. Additionally, network address translators (NAT) using UDP flows involve timeouts that can affect long-running QUIC connections. When a timeout occurs, a NAT rebinding happens and the end point on the outside of the NAT perimeter will see packets coming from a different source port than the one that was established when the connection first occurred. Connection migration and NAT rebinding are just some examples of what makes tracking QUIC connections difficult and can result in packets being dropped or improperly routed. QUIC attempts to addresses this issue by using a connection ID (CID) that each peer uses to map a QUIC session flow. However, CIDs may also change during the lifetime of a connection, with the new CID being negotiated via encrypted frames, thus, a middlebox cannot see that the new CID does not necessarily indicate a new connection. This poses a problem because in order for a middlebox to affect control policies for all traffic, policies must be mapped to connections and there needs to be a way to identify the connection that a packet belongs to. This disclosure describes techniques by which QUIC connections may be efficiently created, traced, and updated as their IP addresses, port numbers, and CIDs change over time without requiring full QUIC packet decryption.

There are two forms of QUIC common headers, long headers and short headers. Long form packets are used for the initial exchange, packets that are sent prior to the completion of version negotiation and until 1-RTT packet protection can be started. Once both of these conditions are met, packets switch to using the short header which is used to carry the bulk of the data. QUIC encrypts all packets inclusive of header information and introduces what is referred to as key levels, whereby, even the TLS handshake is fully encrypted with a key that can be statically generated based on information (e.g., nonces, salts, etc.) predefined for each QUIC version referred to as the initial key. To fully see and track the QUIC sessions, there are five different keys used to protect the different packets in the different states of the QUIC state machine. The techniques described herein detects when a new session is being established by the logic described in detail with reference to the figures below and effectively only need to decrypt the ClientHello packet to obtain the initial negotiated CIDs. Optionally, if present, a server name index (SNI) may be stored and leveraged. Beyond the one specific long header packet type (e.g., ClientHello) no further decryption and no use of the other five keys are required to be able to track and manage a QUIC sessions. Packet logic (based on the QUIC state machine) is used to determine when the CIDs, IP addresses, or port numbers may have changed yet is still the same QUIC session.

A database, referred to as the QUIC connection table, is built and maintained to keep track of the relational structure of known QUIC connections. To build and maintain the database, first the cleartext QUIC header information is inspected. Depending on metadata present in a QUIC packet header, different information based on the packet type (e.g., long header or short header), is gathered.

A long header packet has all the meta data needed available in the header. The IP address, port number, and CID can be verified against the state of connection, as described in the data structure, kept on the table of QUIC connections and relevant states. The long header packet is where most of the connection creation exists as these packets are the ones focused on establishing new connections and states, such as the metadata encryption keys and information pertaining to whether CIDs are to be used or not.

A short header packet does not include the length of the CID in the header, thus, the QUIC connection table will retain the state of whether a QUIC connection uses a 0 or variable length CID. The use of CIDs is established at the very first connection setup using long header packets. The logic, described in detail with reference to the figures below, also includes whether it is indeed a QUIC short header packet or a UDP packet. For connections that use CIDs, the client and the server may negotiate a change of their CIDs using encrypted packets. To avoid full man-in-the-middle packet decryption, an attempt is made to match against known CIDs relating to the corresponding IP-tuples (IP address and port number of a connection endpoint) stored in the QUIC connection table. An IP-tuple includes one IP address and one port number of either the source or the destination of the packet. If there is no match against the CIDs, the packet may still be valid and use a new CID that that was not able to be observed by a network middlebox. As most implementations currently use a CID length of <20 bytes, the 20 bytes is stored as the potential CID. The "learning" technique is to match against these potential CIDs, first N bytes of that CID, if a match is found, the length is corrected to be N and a counter of the number of times this potential CID is observed is kept before promoting it as a known CID. If the CID is used more than a predetermined threshold limit, the CID is promoted to the known CID list. There is a programmable limit on the minimum length, of a CID. Such CIDs must be seen a predetermined number of times before they are promoted to the known CID list. This predetermined occurrence threshold is also programmable.

For efficiency, a hash table is maintained with IP addresses and port numbers as keys to access the IP-tuple, which provides access to its multiple QUIC-tuple maps. The QUIC-tuple mapping links the IP-tuples to CIDs and its related QUIC connections. Because packets are not decrypted, the process flow will not detect or see the signals between the client and server when they are negotiating a connection migration (e.g., a change in IP address, port number, or CID) as those packets will be encrypted. Instead, the observed similarities (e.g., unknown destination IP address, but know source IP address and CID) will be used to identify a packet to a known connection. To manage the number of connections that are kept track of a timer queue is used to provide a programmable limit on the number of QUIC connections tracked. A timeout value is used to get rid of QUIC connections that exceed the limit and additionally connections are evicted in a least recently used fashion once the limit for the number of tracked connections is reached. The timeout value for a connection is updated every time a valid packet corresponding to that connection is received.

FIG. 1 illustrates an example environment 100 of a partial system architecture that uses QUIC protocol for communication. Environment 100 includes one or more client devices 102. The client devices 102 may be used for purposes that require high speed online services. For example, the client devices 102 may belong to end users in a network organization that routinely rely on VoIP. In another example the client devices 102 may be used for online gaming or streaming. FIG. 1 also includes multiple application servers 104. An example application server 104 may be a gaming or video streaming server. The client devices 102 communication with the application servers 104 over a network or networks 106 such as the internet. Environment 100 includes the client devices 102 communicating with the application servers 104 over a network 106 using QUIC packets 108. Additionally, environment 100 also includes two firewalls 110. The firewalls 110 are examples of middleboxes in a network architecture that a QUIC packet 108 may be routed through when transmitted from one end point to another. Although FIG. 1 illustrates a firewall as an example middlebox 110, the techniques described herein are not limited to firewalls and may be any appropriate type of middlebox in a network, such as a load balancer, content delivery network (CDN), a WAN optimizer, NATs, a cloud based gateway, a cloud based firewall, a secure router, etc. Finally, environment 100 also includes QUIC connection table databases 112. A QUIC connection table database 112 contains all the QUIC connection mappings between end points. QUIC connection mappings are described in more detail below with reference to FIG. 2.

In an environment such as environment 100, for a middlebox, in this case the firewalls 110, to affect control policies for the QUIC packets 108, the policies must be mapped to connections and there needs to be a way to identify the connections that a QUIC packet 108 belongs to. The QUIC connections are identified, tracked, and updated in the QUIC connection table database 112 as their IP addresses, port numbers, and CIDs change over time. To build and maintain the QUIC connection table database 112 a QUIC packet header is inspected, and depending on the metadata present in the QUIC packet header, different information is gathered, and a determination made as to the QUIC connection the packet belongs to. The specific logic used to determine the QUIC connection a packet belongs to is described in more detail below and illustrated in FIGS. 3-6B. The firewalls 110 use the QUIC connections mappings stored in the QUIC connection table database 112 to determine the QUIC connection a QUIC packet 108 belongs to. Once the QUIC connection is determined, the middlebox 110 can apply policy and determine whether to process the QUIC packet 108 or drop the QUIC packet 108.

The above-noted example is merely illustrative, and various changes can be made to achieve similar or the same results. For instance, rather than a firewall as a middlebox is such an environment, the techniques can similarly be performed using other middleboxes such as load balancers or NAT, for example.

Figure 2:
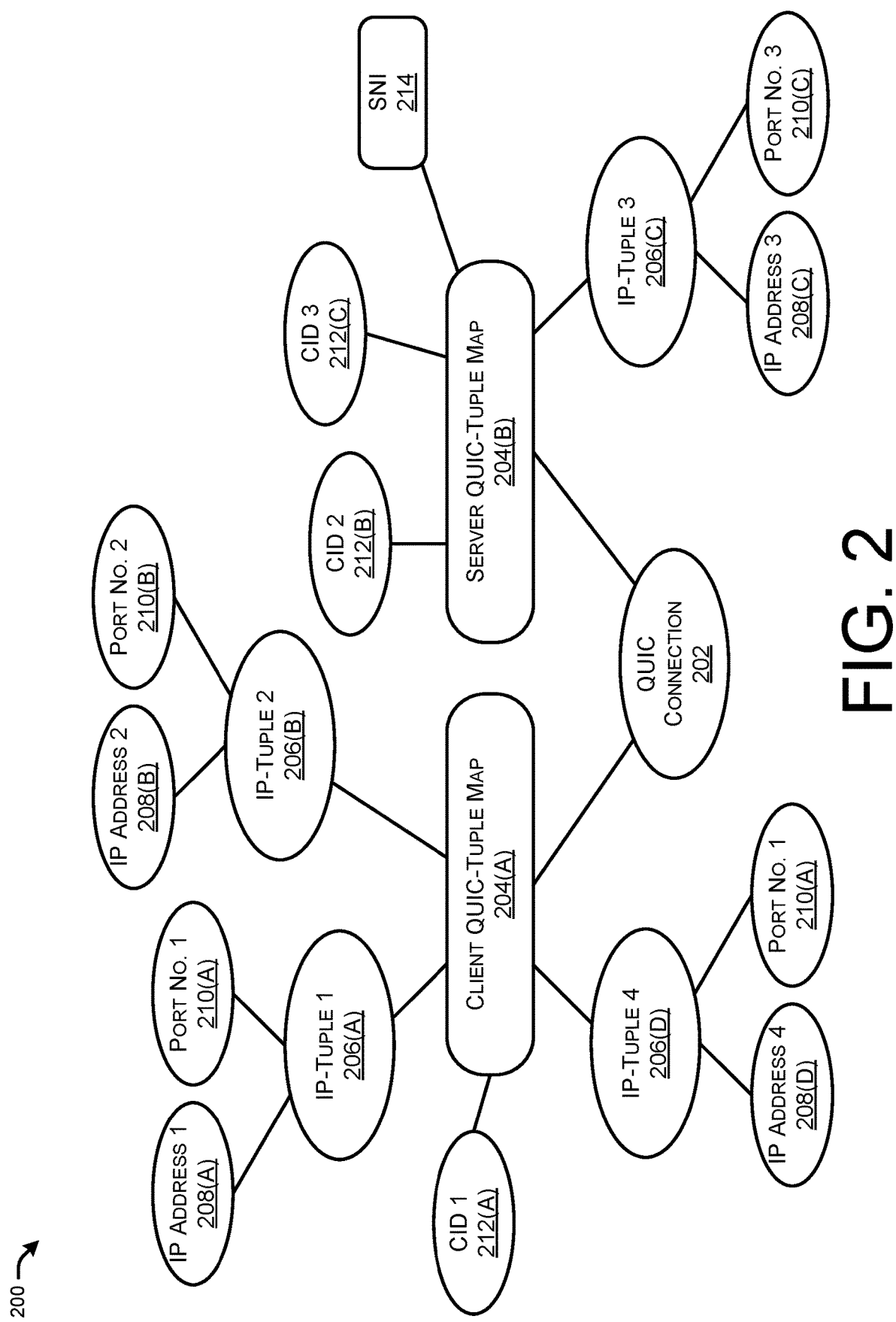
FIG. 2 is an example of QUIC connection mapping that exemplifies a relational structure of known QUIC connections.

FIG. 2 illustrates an example data structure 200 of a QUIC connection map for a QUIC connection between a client and a server. The data structures are based on relations and observations based on the use of CIDs and rules as defined in IETF RFC's 8999, 9000, 9001, and 9002. The QUIC connection map illustrated in FIG. 2 has an established QUIC connection 202 between a client and a server. The known client data structures are depicted with client QUIC-tuple map 204(A) and the known server data structures are depicted in server QUIC-tuple map 204(B). Each QUIC-tuple map 204 consists of one or more IP-tuples 206 and one or more CIDs 212. Each IP-tuple 206 consists of one IP address 208 and one port number 210. In some instances, a server QUIC-tuple map may also include a server name index (SNI) as shown in the example in FIG. 2 where SNI 214 is connected to server QUIC-tuple map 204(B).

Client QUIC-tuple map 204(A) is shown with three known IP-tuples associated with QUIC connection 202, IP-tuple 1 206(A), IP-tuple 2 206(B), and IP-tuple 4 204(D). Even though the three IP-tuples may have different IP addresses 208 and/or port number 210, they are associated with the same client device that is described by client QUIC-tuple map 204(A). IP-tuple 1 206(A) and IP-tuple 4 206(D) have the same port number, port no. 1 210(A) but different IP addresses. IP-tuple 2 206(B) has a different IP address, IP address 2 208(B), and different port number, port no. 2 210(B), than either IP-tuple 1 206(A) or IP-tuple 4 206(D). The multiple IP-tuples 206 associated with client QUIC-tuple map 204(A), may be the result of the client device, such a mobile phone, associated with client QUIC-tuple map 204(A) having migrated from a cellular network to a Wi-Fi network. Alternately or in addition, the multiple IP-tuples 206 associated with client QUIC-tuple map 204(A) may be a result of NAT rebinding whereby a different IP address 208 and/or port no. 210 are assigned due to a timeout. In such an instance, when a mobile device migrates from one network to another, or a timeout occurs, a new IP address and/or a new port number will be assigned, even though the source device is the same device and the connection to the sever is the same QUIC connection, in this case QUIC connection 202.

Alternately or in addition, a CID 212 for QUIC connection 202 may also change and still be the same QUIC connection 202. A client and a server may negotiate a change of their CIDs using encrypted packets. In which case, the firewall does not see the CID change negotiation, and will not know that the QUIC connection is the same connection even though the CID has changed. For example, the QUIC connection map shown in FIG. 2 illustrates three CIDs that are associated with the QUIC connection 202, CID 1 212 (A), CID 2 212(B), and CID 3 212(C). The initial CID may be CID 2 212(B) when the QUIC connection 202 is initiated. Later, the client and server may negotiate a change to using CID 3 212(C) for packets belonging to QUIC connection 202. However, the negotiation to chance the CID may be encrypted, thus a middlebox will not see the negotiation and may determine that a packet with CID 3 212(C) does not belong to QUIC connection 202. However, using technique described herein for tracking and managing QUIC connections, a middlebox will be able to determine that packets with the new CID 3 212(C) do belong to QUIC connection 202, and the middlebox will apply appropriate policy and route the packets correctly.

Figure 3A:
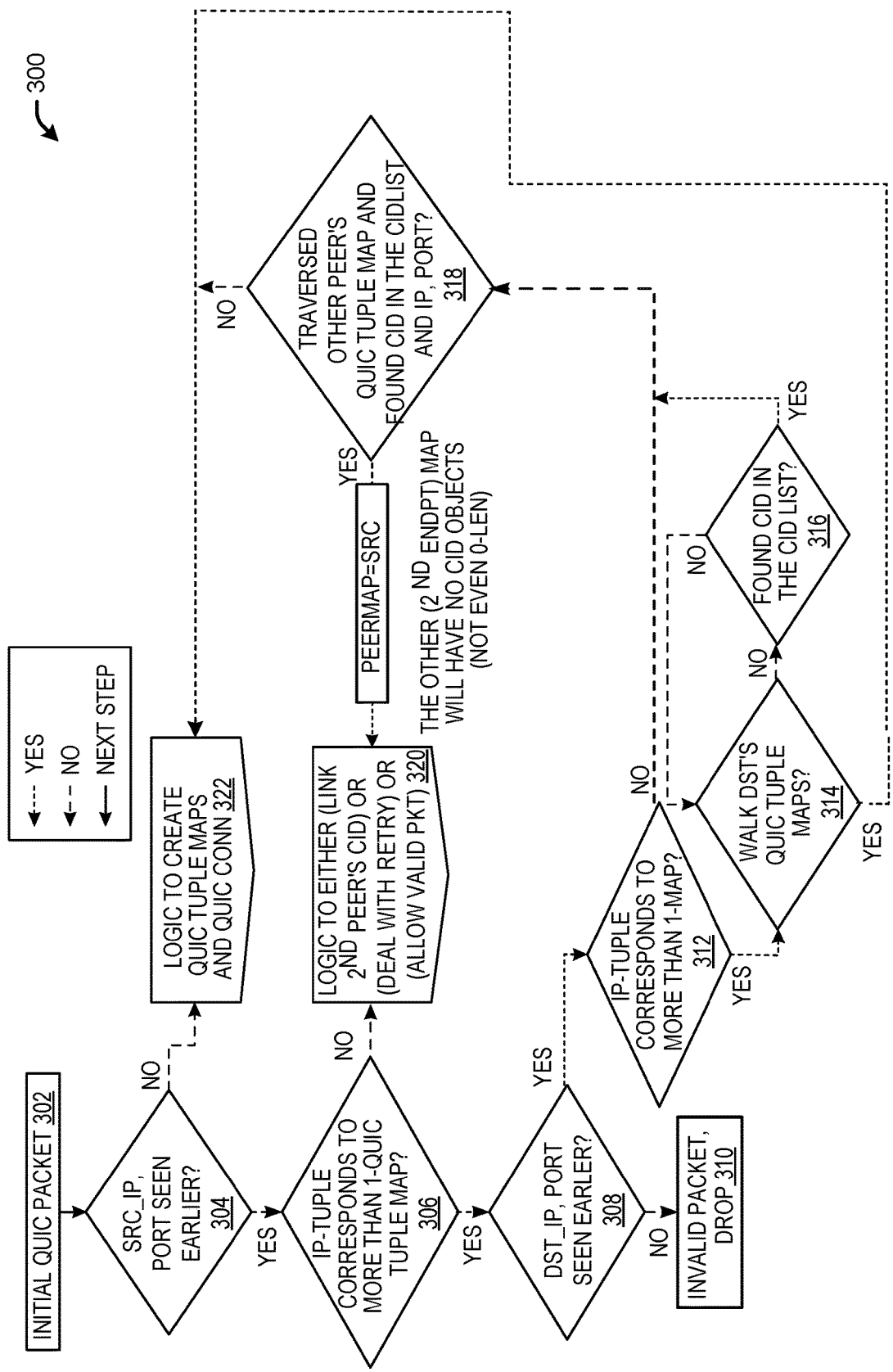
FIG. 3A, FIG. 3B, and FIG. 3C is a flow diagram of the process for creation, identification and update of an initial QUIC packet with a long header that includes logic for creating QUIC-tuple maps, processing QUIC packets and dropping QUIC packets.
Figure 3B:
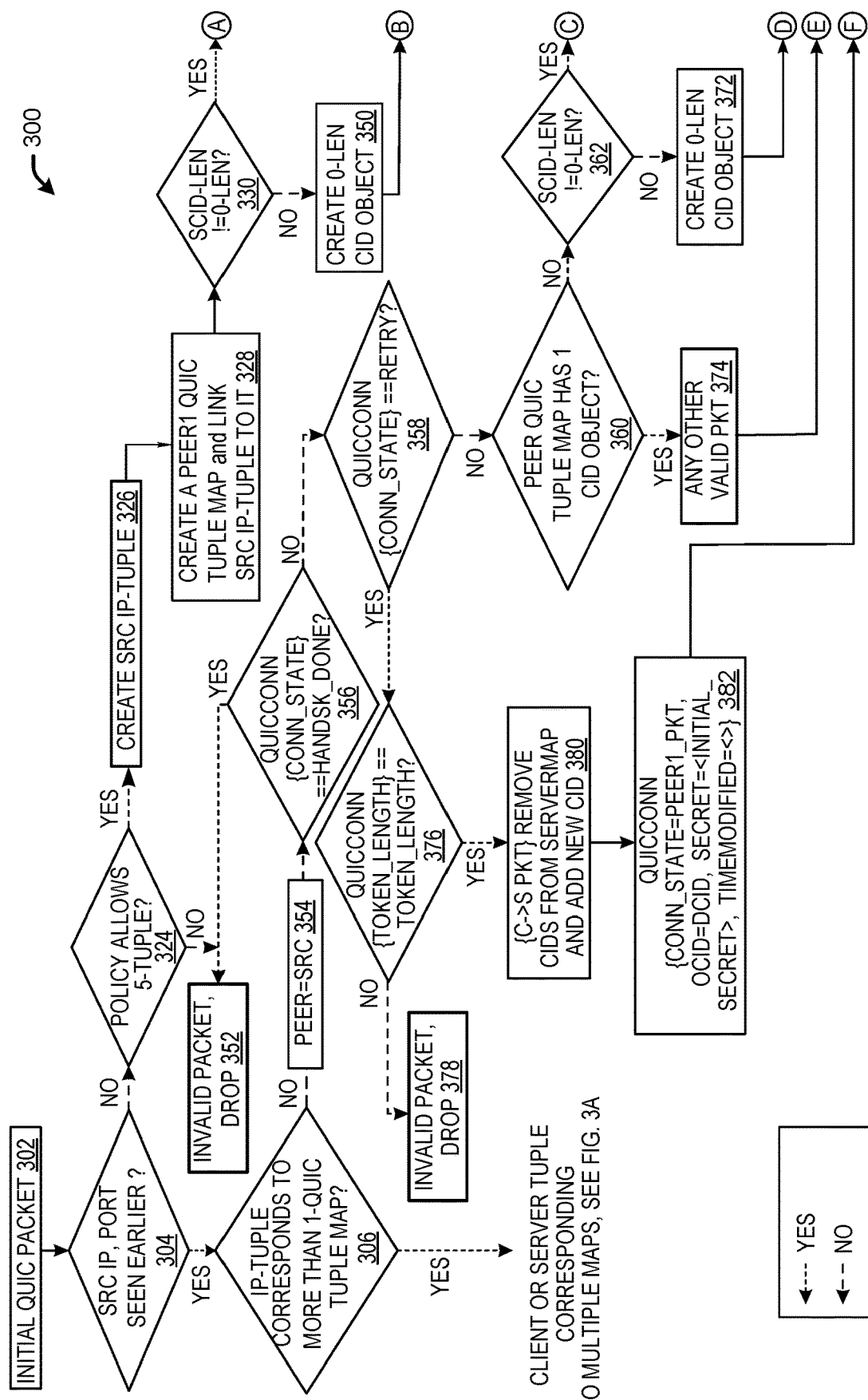
Figure 3C:
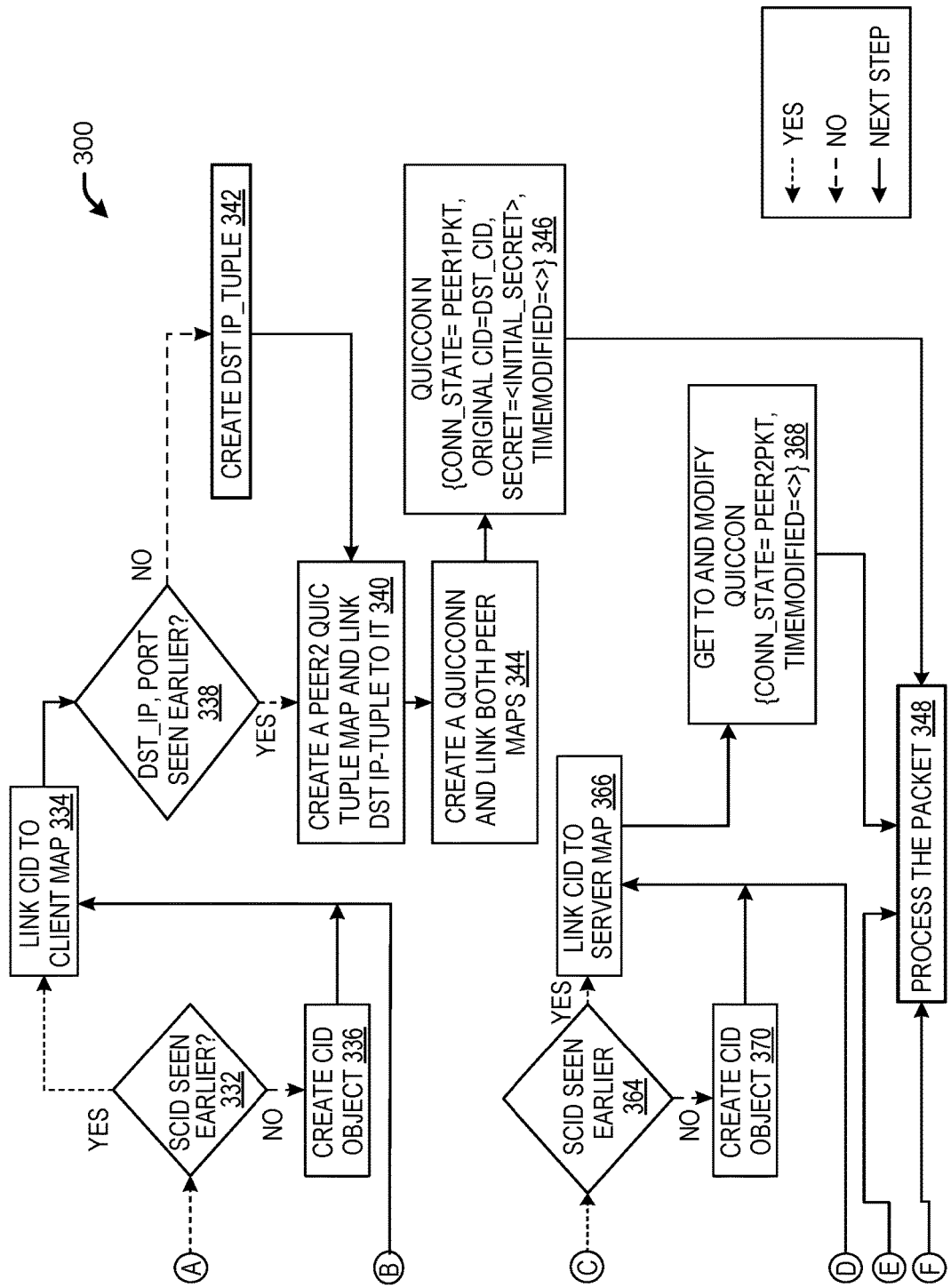

FIGS. 3A-3C illustrates flow diagram 300 that details the logic process for creating, tracking, and managing QUIC connections for an initial long header QUIC packet. Aspects of the operations may be performed at least partly by the devices in the system architecture as described in FIG. 1 and with respect to the QUIC-tuple mapping described with reference to FIG. 2. The logical operations described herein with respect to FIGS. 3A-3C may be implemented (1) as a sequence of computer-implemented acts or program modules running on a computing system and/or (2) as interconnected machine logic circuits or circuit modules within the computing system.

The QUIC connection relational data structure maps, examples of which are illustrated in FIG. 2, can be walked to effectively create, identify, and update QUIC connections in the QUIC connection table database 112 of FIG. 1. Long initial QUIC packets use the following process for a packet from which a source IP address, source port number and source CID have been extracted from the QUIC packet header.

At operation 302, a QUIC packet is determined to be an initial QUIC packet with a long header. The initial QUIC packet is received by a middlebox. For example, a middlebox 110 of FIG. 1.

At operation 304, a determination is made whether the source IP-tuple has been seen before in the hash table or not.

At operation 306, if the source IP-tuple has been seen before in the hash table, then traverse (in order of least recently created) QUIC-tuple maps (e.g., QUIC-tuple maps as shown in FIG. 2) that contain the source IP-tuple.

At operation 308, the QUIC tuple maps that contain the source IP-tuple are found and a determination made whether the destination IP-tuple has been seen earlier is made.

At operation 310, if the destination IP-tuple has not been seen before, the QUIC packet is invalid and the middlebox will drop it.

At operation 312, if the destination IP-tuple has been seen before a determination is made whether there are multiple QUIC maps that have the source IP-tuple and the destination IP-tuple.

At operation 314, if the source and destination IP-tuple does correspond to more than one QUIC tuple map, each QUIC tuple map is traversed until there are no more QUIC tuple maps having matching source and destination IP-tuples.

At operation 316, as each QUIC tuple map is traversed, the CID is checked against a known CID list. If the CID is not in the known list, the next QUIC tuple map is traversed.

At operation 318, if a matching CID is found, then the current QUIC-tuple map is a part of the QUIC connection to traverse. The other peer in the QUIC tuple map is traversed and the CID and IP-tuple of the other peer are checked to see if they are found.

If the CID and IP-tuple are found, the peer map is the source and the other (second endpoint) map will have no CID objects, not even 0-length. Thus, proceed to operation 320, to either link the second peer's CID or allow a valid packet, details of which are described with reference to FIG. 3B and FIG. 3C.

If at operation 318, a QUIC map does not have an entry in the CID list, proceed to operation 322 where then the CID could be the CID that the server assigned itself. Check the destination CID of the connection. If the destination CID matches and the destination IP-tuple match then it is the same connection, add the source CID to the empty CID list.

If at operation 312, the destination IP-tuple does not correspond to more than one QUIC tuple map, proceed to operation 318.

If at operation 304, the source IP-tuple (source IP address and source port number) has not been seen before, proceed to operation 322 to create a new QUIC tuple map and QUIC connection. For example, If the QUIC packet contains a ClientHello message, then create a QUIC-tuple map, add the CID to the map and create a new QUIC connection. If the QUIC packet does not contain a ClientHello message, drop the packet as there is no QUIC connection.

For detail of operation 322, see FIG. 3B FIG. 3C beginning with the source IP-tuple not being seen before at operation 304.

At operation 324, a determination is made whether a policy exists that allows the 5-tuple in the packet.

If the policy does allow the 5-tuple, at operation 326 a source IP-tuple is created for the source IP address and source port number.

At operation 328, a peer1 QUIC tuple map is created, and the source IP-tuple is linked to it.

At operation 330, a determination is made whether the source CID is 0-length.

If the source CID is 0-length, at operation 332, a determination is made whether the source CID has been seen earlier.

If the source CID has, at operation 334 the CID is linked to the client IP-tuple map.

If the source CID has not been seen before, at operation 336 a CID object is created and then linked to the client IP-tuple map at operation 334.

At operation 338 a determination is made whether the destination IP address and port number have been seen earlier.

If the destination IP address and port number have been seen earlier, at operation 340 a peer2 QUIC tuple map is created and linked to the destination IP-tuple.

If the destination IP address and port number have not been seen earlier, a new destination IP-tuple is created at 342 and then a peer2 QUIC tuple map created, and the new destination IP-tuple linked to it at 340.

Once the peer2 QUIC tuple map has been created and the destination IP-tuple linked to it, at operation 344 a QUIC connection is created and the peer1 QUIC tuple map and peer2 QUIC tuple map linked to the QUIC connection.

At operation 346, the connection details are checked to make sure that the QUIC connection state machine is adhered to.

At operation 348, the QUIC packet is processed.

If at operation 330 the source CID length is not 0-length, a 0-length CID object is created at operation 350 and the process is continued at operation 334 as described above.

Returning to operation 324, if the policy does not allow the 5-tuple, the QUIC packet is invalid and is dropped at operation 352.

Returning to operation 306, if the IP-tuple does not correspond to more than one QUIC tuple map, the peer is the source at 354.

At operation 356, the QUIC connection state machine is checked to see if the handshake is complete.

If the handshake is complete, the QUIC packet is invalid, and the packet is dropped at 356.

If the handshake is not complete, at operation 358 a determination is made whether the connection state is a retry.

If it is not a retry at operation 358, at operation 360 a determination is made whether the peer QUIC tuple map has one CID object.

If the peer QUIC tuple map does not have one CID object, at operation 362 a determination is made whether the source CID is a 0-length CID.

If the source CID is 0-length, at operation 364 a determination is made whether the server CID has been seen earlier.

If the source CID has been seen earlier, at operation 366 link the CID to the server QUIC tuple map.

At operation 368, the connection state of the QUIC connection is a peer2 packet.

At operation 348, the QUIC packet is processed.

If at operation 364, the source CID has not been seen earlier, at operation 370 a new CID object is created and then linked to the server map at operation 366 and the process continues as described above.

If at operation 362 the source CID length is not 0-length, at operation 372 a 0-length CID object is created and linked to the server map at operation 366 and the process continues as described above.

If at operation 360, the peer QUIC tuple map does have a CID object, at operation 374 the packet is valid and is processed at operation 348.

If at operation 358 the QUIC connection state is a retry, at operation 376 a determination is made whether the token length is correct.

If the token length is not correct, at operation 378 the QUIC packet is invalid and will be dropped.

If at operation 376, the token length is correct, at operation 380 the QUIC packet is a client to server packet. The CID is removed from the server QUIC tuple map and the new CID is added.

At operation 382, the QUIC connection state is a peer1 packet where the original CID is the destination CID, and the secret is the initial secret.

The process continues at operation 348 where the packet is processed.

Figure 4A:
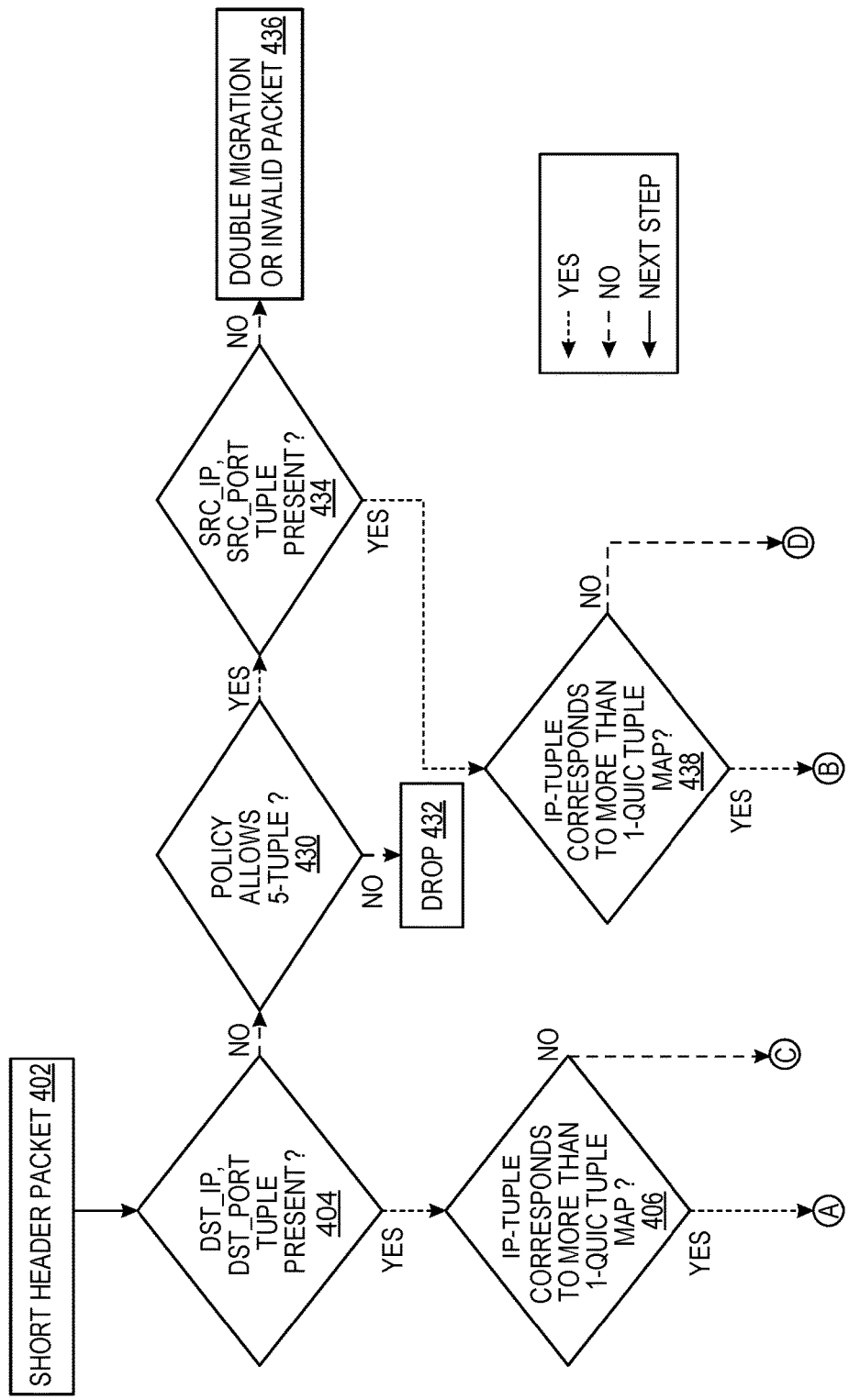
FIG. 4A, FIG. 4B, and FIG. 4C is a flow diagram of the process for creation, identification and update of a QUIC packet with a short header when an IP-tuple corresponds to more than one QUIC map.
Figure 4B:
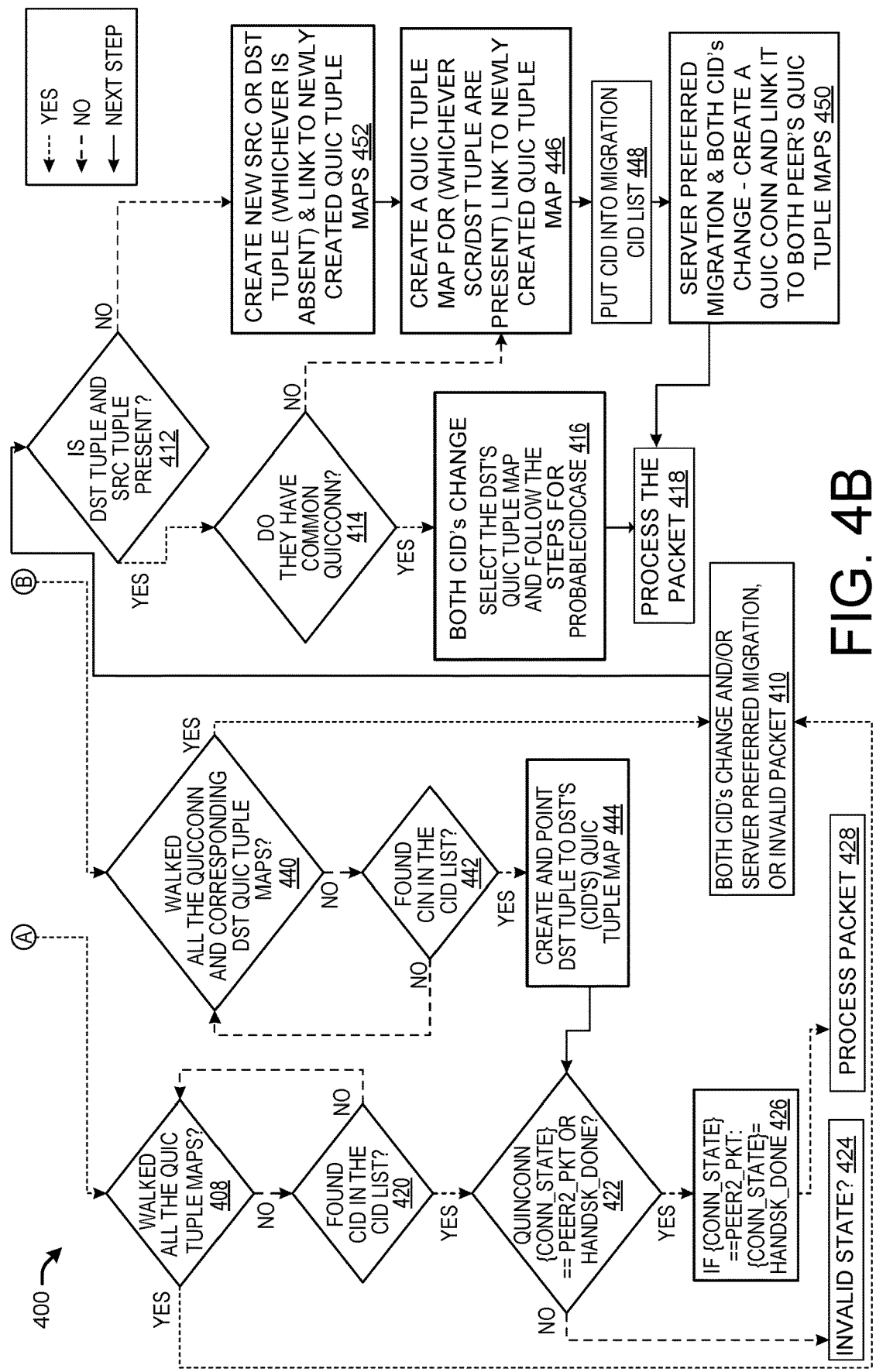
Figure 4C:
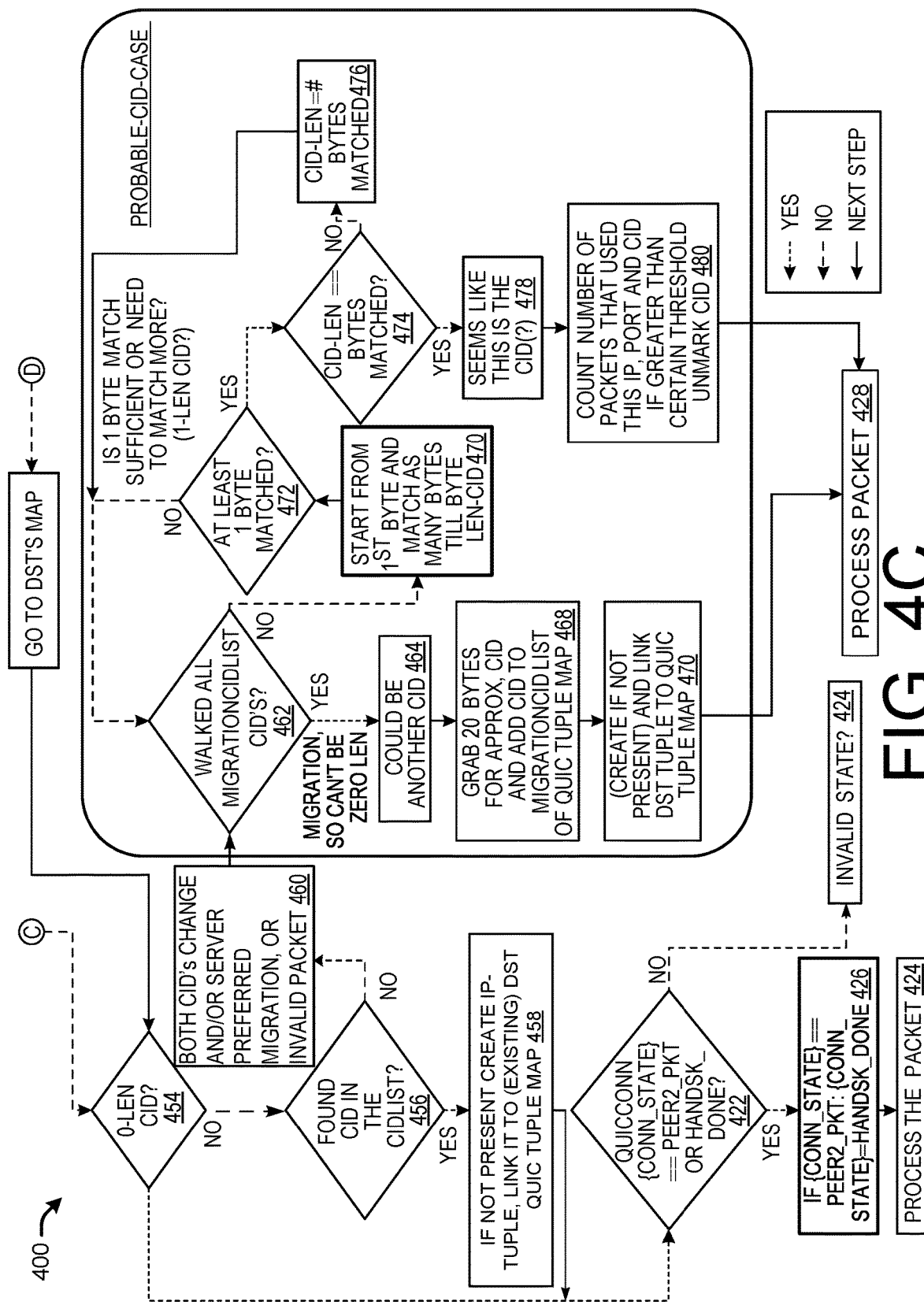

FIGS. 4A-4C is flow diagram 400 that collectively illustrate the logic process for creating, tracking, and managing QUIC connections for short header QUIC packets. Aspects of the operations may be performed at least partly by the devices in the system architecture as described in FIG. 1 and with respect to the QUIC-tuple mapping described in FIG. 2. The logical operations described herein with respect to FIGS. 4A-4C may be implemented (1) as a sequence of computer-implemented acts or program modules running on a computing system and/or (2) as interconnected machine logic circuits or circuit modules within the computing system.

At operation 402, a QUIC packet is determined to be a short header packet. When a QUIC packet is not an initial QUIC packet with a long header, and the QUIC packet has a short header, the following process will be used to determine which, if any, QUIC connection a packet with a destination IP address, destination port number, and destination CID belongs to.

At operation 404, a determination is made whether a destination IP address and a destination port number are present the hash table. For example, does the IP-tuple appear in the hash table in the QUIC connection database 112 as shown in FIG. 1.

If the destination IP-tuple (destination IP address and destination port number) are present in the hash table, at operation 406 a determination is made whether the destination IP-tuple corresponds to more than one QUIC tuple map. For example, a QUIC tuple map as illustrated in FIG. 2.

At operation 408 if the destination IP-tuple has been seen before in the hash table, then traverse all QUIC tuple maps associated with the destination IP-tuple and look for a known CID.

Once all the QUIC tuple maps having the destination IP-tuple have been traversed and no known CID has been found, at operation 410 one of the following conditions has occurred, either both CIDs (destination CID and source CID) have changed, and/or server preferred migration has occurred, or the QUIC packet is an invalid packet.

At operation 412, a determination is made whether the destination IP-tuple and source IP-tuple are present.

At operation 414, if both the destination IP-tuple and source IP-tuple are present, a determination is made whether they have a common QUIC connection or not.

At operation 416, if the destination IP-tuple and the source IP-tuple are present and have a common QUIC connection, both CIDs have changed. Select the destination QUIC tuple map and follow the steps for a probable CID case, the logic details of which are shown on FIG. 4C. If the probable CID has been seen a predetermined number of time, it is promoted to a known CID and added to the known CID list in the QUIC connection table database.

At operation 418, the QUIC connection has been found, process the QUIC packet.

If at operation 408, not all the QUIC tuple maps have been traversed, continue to walk all the QUIC tuple maps with the destination IP-tuple until a known CID is found.

At operation 420 a determination is made whether the CID is present in a known CID list in the QUIC connection table database.

At operation 422, a determination is made whether the QUIC connection state is a peer2 packet and QUIC connection handshake is complete.

At operation 424, if the QUIC connection state is not a peer2 packet and the handshake is not done, the QUIC packet may be invalid and will be dropped.

If at operation 422, the connection state is a peer2 packet and the QUIC connection handshake is complete at operation 426 the packet is valid.

At operation 428 the QUIC packet is processed.

If at operation 404, the destination IP address and destination port number are not present in the hash table, at operation 430 a determination is made whether a policy allows the 5-tuple.

At operation 432, if the 5-tuple is not allowed by the policy the QUIC packet will be dropped.

If the at operation 430 the policy does allow the 5-tuple, at operation 434 a determination whether the source IP address and source port number are present in the hash table.

If the source IP-tuple is not present in the hash table at operation 436 either double migration has occurred, or the QUIC packet is invalid.

If at operation 434 the source IP-tuple is present in the hash table, at operation 438 a determination will be made whether the source IP-tuple corresponds to more than one QUIC tuple map.

At operation 440 if the source IP-tuple has been seen before in the hash table, then traverse all QUIC tuple maps corresponding to the source IP-tuple and look for a known CID.

Once all the QUIC tuple maps having the source IP-tuple have been traversed and no known CID has been found, the process continues at operation 410 as described above.

At operation 442, if a known CID is found in the hash table while traversing the QUIC connection and corresponding destination QUIC tuple maps in operation 440, a destination IP-tuple is created that points to the destination CID QUIC tuple map at operation 444. The logical process then continues at operation 442 as described above.

If at operation 414, the destination IP-tuple and the source IP-tuple do not have a common QUIC connection, at operation 446 a new QUIC tuple map is created for whichever is present, source IP-tuple or destination IP-tuple, and link it to the newly created QUIC tuple map.

At operation 448, the CID is added to a list of migration CIDs.

At operation 450, server preferred migration has occurred, and both the destination CID and source CID have changed, so a new QUIC connection is created and linked to both the peer's QUIC tuple maps. Then the QUIC packet is processed at operation 418.

If at operation 412, the destination IP-tuple or source IP-tuple are not present in the hash table, at operation 452 a new source or destination IP-tuple is created and linked to the newly created QUIC tuple maps. The process then continue at operation 446 as described above.

If at operation 406 the IP-tuple does not correspond to more than one QUIC tuple map, at operation 454 a determination is made whether the CID is 0-length or not.

If the CID is 0-length, the process proceeds to operation 422 as described above.

If the CID is not 0-length, at operation 456 a determination is made whether the CID is found in a list of known CIDs in the hash table in the QUIC connection table database.

At operation 458, if the CID is found in the list of known CIDs, an IP-tuple is created (if not present) and linked to the existing destination QUIC tuple map. The logical process then continues at operation 422 as described above.

If at operation 456 the CID is not found in the list of known CIDs, at operation 460 both CIDs have changed and/or server preferred migration has occurred, or the QUIC packet is an invalid packet. The process now continues for a probable CID case.

At operation 462, the migration CID list is traversed.

At operation 464, if the CID is found in the probable CID list with a satisfactory CID length (it cannot be 0-length) the CID could be another CID.

At operation 468, 20 bytes are grabbed for approximation of a CID and added to the migration CID list of the QUIC tuple map.

At operation 470, if a destination IP-tuple is not present, it is created and linked to the QUIC tuple map. The packet is then processed at operation 428.

If at operation 462, a probable CID is not found, at operation 470, start form a first byte and matching as many bytes as necessary until the CID byte length is reached.

At operation 472, a determination is made whether at least one byte is matched, if not, the process proceeds at operation 462.

If a at least one byte is matched at operation 472, at operation 474 a determination whether the bytes matched is the same as the CID length is made.

At operation 476 if the bytes matched is not the CID length, the process proceed to operation 462 as described above.

If at operation 474 the bytes matched equals the CID length, at operation 478, it may be a probable CID.

At operation 480, the number of packets that used the IP address, port number, and CID are counted and if the number is greater than a predetermined threshold number, the CID is determined to be a probable CID and the packet is processed at operation 428.

Figure 5A:
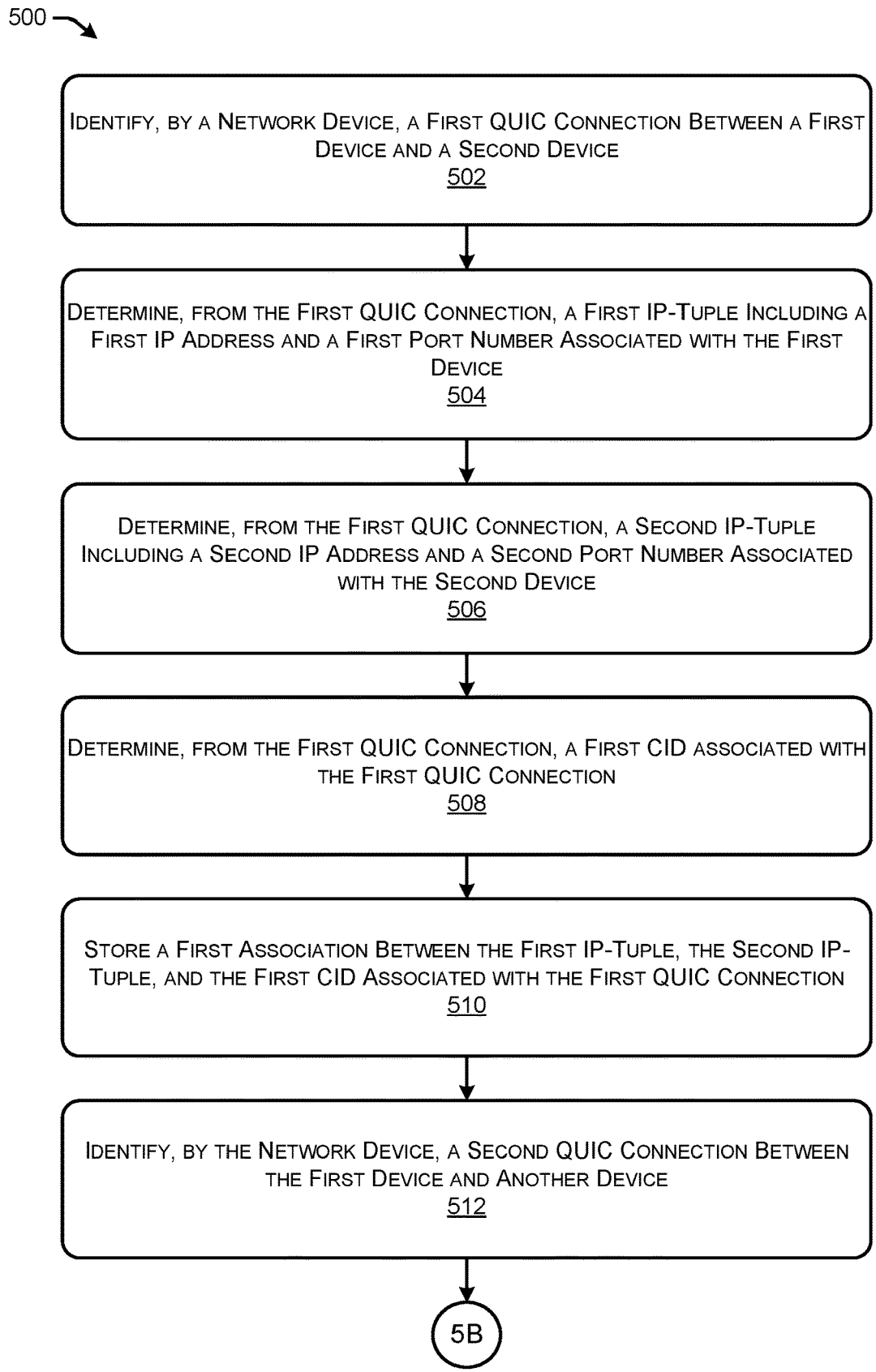
FIG. 5A and FIG. 5B is a flow diagram for a method of determining a QUIC connection for a QUIC packet.
Figure 5B:
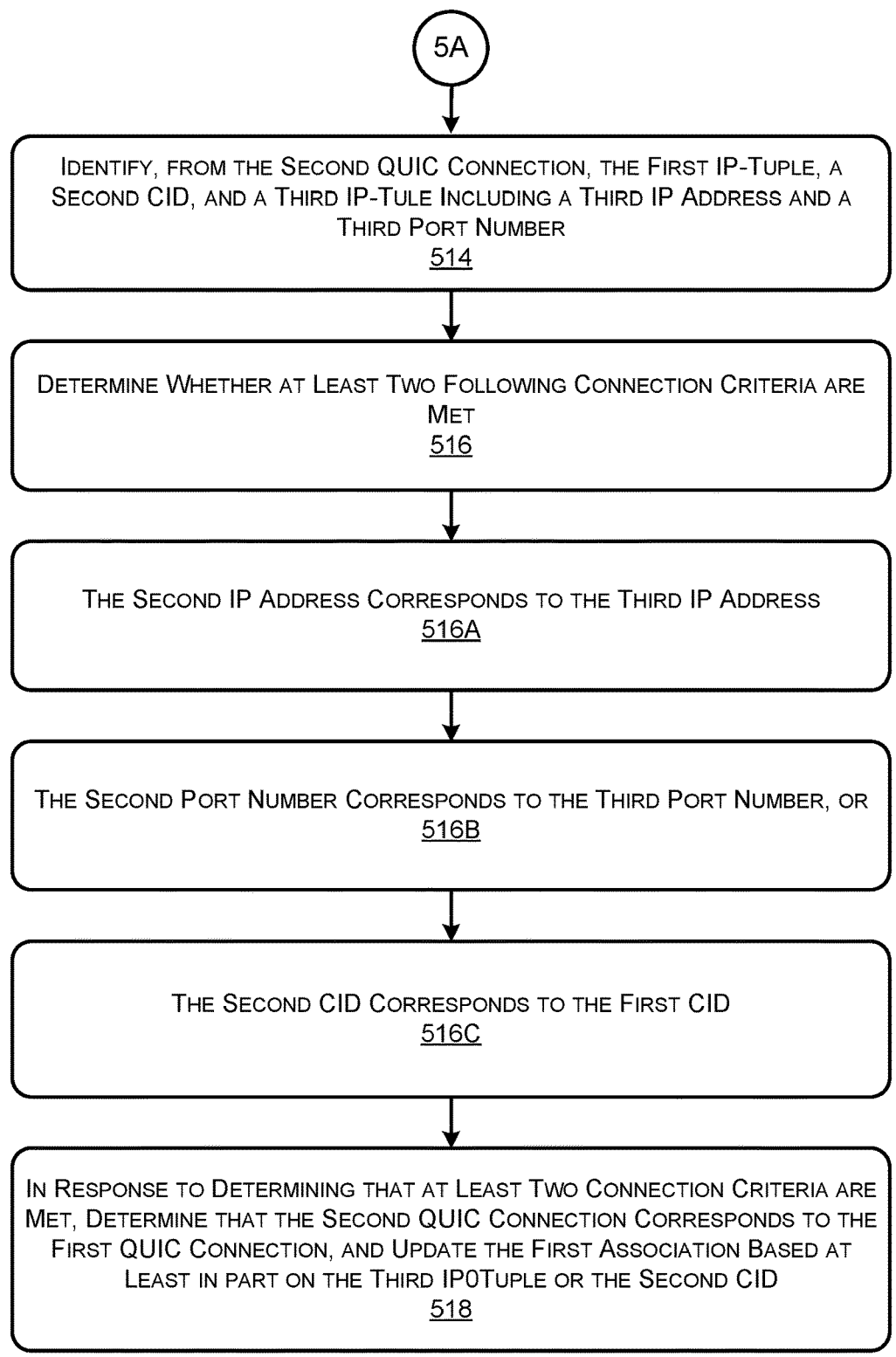

FIGS. 5A and 5B collectively illustrate a flow diagram 500 of a method for determining whether a first QUIC session is the same as a second QUIC session. Aspects of the operations may be performed at least partly by the devices in the system architecture as described in FIG. 1 and with respect to the QUIC-tuple mapping described in FIG. 2. The logical operations described herein with respect to FIGS. 5A and 5B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A and 5B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 502, a first QUIC connection between a first device and a second device is identified by a network device. For example, referring to FIG. 1, a QUIC connection between a client device 102 and an application server 104 is established and identified by a middlebox 110. Additionally, the QUIC connection may be QUIC connection 202 as illustrated in FIG. 2.

At operation 504, a first IP-tuple including a first IP address and a first port number associated with the first device is determined from the first QUIC connection. Referring to FIG. 2, IP-tuple 3 206(C) with IP address 3 208(C) and port number 3 210(C) may be the first IP-tuple associated with the first device. The first device being a server with server QUIC-tuple map 204(B). With reference to FIG. 1, an application server 104 may be the first device that is associated with the first IP-tuple.

At operation 506, a second IP-tuple including a second IP address and a second port number associated with the second device is determined from the first QUIC connection. Referring again to FIG. 2, IP-tuple 1 206(A) having IP address 1 208(A) and port number 1 210(A), may be associated with the second device in the QUIC connection 202. With reference to FIG. 1, a client device 102 may be the second device that is associated with the second IP-tuple.

At operation 508, a first CID associated with the first QUIC connection is determined from the first QUIC connection. For example, with reference to FIG. 2, CID 2 212(B) may be associated with the QUIC connection 202.

Operations 504, 506, and 508 may be implemented by the middlebox 110 when inspecting an initial QUIC packet 108 as depicted in FIG. 1. Because the QUIC packet 108 is on top of UDP/IP, the middlebox 110 can determine a source and destination IP address and a source and destination port number. Additionally, the QUIC packet 108 header can be inspected to determine the CID associated with the initial QUIC connection. Referring to FIG. 2, the initial QUIC connection may be QUIC connection 202. The middlebox 110 may observe QUIC packet 108 (that is on top of UDP/IP) and determined that IP-tuple 3 206(C), IP-tuple 1 206(A), and CID 2 212(B) are all associated with QUIC connection 202.

At operation 510 a first association between the first IP-tuple, the second IP-tuple, and the first CID associated with the first QUC connection is stored. Continuing with the example above, an association between IP-tuple 3 206(C), IP-tuple 1 208(A), and CID 2 212(B) is stored in the QUIC connection table DB 112 of FIG. 1 as being associated with the first QUIC connection.

At operation 512, a second QUIC connection between the first device and another device is identified by the network device. For example, the middlebox 110 of FIG. 1 may observe another QUIC packet 108 that appears to belong to a QUIC connection between the first device, the application server 104 having IP-tuple 3 206(C), and another device, because either the CID and/or the IP-tuple are different than those observed when identifying the first QUIC connection.

At operation 514, the first IP-tuple, a second CID, and a third IP-tuple including a third IP address and a third port number are identified from the second QUIC connection. For example, middlebox 110 may inspect a QUIC packet 108 and determine that first IP-tuple, IP-tuple 3 206(C), a third IP-tuple, for example IP-tuple 4 206(D) having IP address 4 208(D) and port number 1 210(A), and CID 2 212(B) are associated with the second QUIC connection.

At operation 516, a determination is made whether at least two of the following connection criteria are met. For example, in FIG. 1 the middlebox 110 can identify from a QUIC packet 108 whether two or the following connection criteria are met.

A first connection criteria 516A is the second IP address corresponds to the third IP address. The second IP address, IP address 1 208(A) in the continuing example, does not correspond to the third IP address, IP address 4 208(D).

A second connection criteria 516B is the second port number corresponds to the third port number. The second port number, port no. 1 210(A) of IP-tuple 1 206(A) does correspond to the third port number, port no. 1 210(A) of IP-tuple 4 206(D).

A third connection criteria 516C is the second CID corresponds to the first CID. The second CID, CID 212(B), does correspond to the first CID, CID 212(B).

At operation 518, determine that the second QUIC connection corresponds to the first QUIC connection in response to determining that at least two of the connection criteria are met, and update the first association based at least in part on the third IP-tuple or the second CID. Continuing with the above example, two of the three connection criteria are met, connection criteria 516B and connection criteria 516C. Thus, the QUIC connection 202 of FIG. 2 is updated in the QUIC connection table database 112 of FIG. 1, to include not only IP-tuple 3 206(C), IP-tuple 1 206(A), and CID 212(B), but also IP-tuple 4 206(D) as a known IP-tuple associated with QUIC connection 202.

Figure 6:
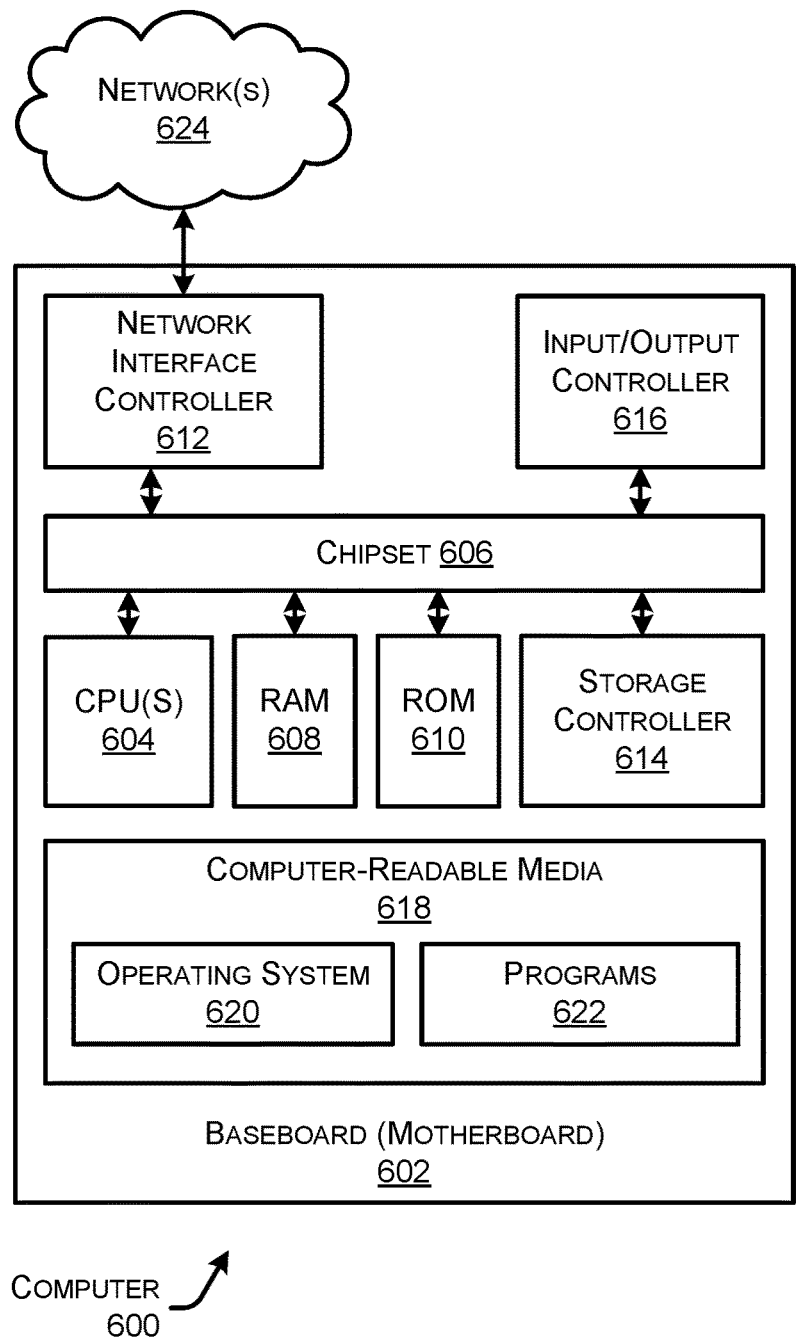
FIG. 6 is a computer architecture diagram showing an illustrative computer hardware architecture for implementing a computing device that can be utilized to implement aspects of the various technologies presented herein.

FIG. 6 is a computer architecture diagram showing an illustrative computer hardware architecture for implementing a computing device that can be utilized to implement aspects of the various technologies presented herein. The computer architecture shown in FIG. 6 illustrates a conventional server computer, controller, computing resource, switch, router, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the networks 106. The chipset 606 can include functionality for providing network connectivity through a NIC 612, such as a gigabit Ethernet adapter. The NIC 612 is capable of connecting the computer 600 to other computing devices over the network 624 and networks 106. It should be appreciated that multiple NICs 612 can be present in the computer 600, connecting the computer to other types of networks and remote computer systems. In some examples, the NIC 612 may be configured to perform at least some of the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, QUIC connection table database 112 and or any components included therein, may be supported by one or more devices similar to computer 600. Stated otherwise, some or all of the operations performed by the QUIC connection table database 112, and or any components included therein, may be performed by one or more computer devices 600 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-6B. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for identifying, tracking, and managing QUIC connections. The programs 622 may enable the middlebox 110 (or various other middleboxes) and the QUIC connection table database 112 to perform various applications.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
identifying, by a network device, a first QUIC connection between a first device and a second device;
determining, from the first QUIC connection, a first IP-tuple including a first IP address and a first port number associated with the first device;
determining, from the first QUIC connection, a second IP-tuple including a second IP address and a second port number associated with the second device;
determining, from the first QUIC connection, a first connection identifier (CID) associated with the first QUIC connection;
storing a first association between the first IP-tuple, the second IP-tuple, and the first CID associated with the first QUIC connection;
identifying, by the network device, a second QUIC connection between the first device and another device;
identifying, from the second QUIC connection, the first IP-tuple, a second CID, and a third IP-tuple including a third IP address and a third port number;
determining whether at least two following connection criteria are met:
the second IP address corresponds to the third IP address;
the second port number corresponds to the third port number; or
the second CID corresponds to the first CID; and
in response to determining that at least two connection criteria are met, determining that the second QUIC connection and the first QUIC connection are a same QUIC connection, and updating the first association based at least in part on the third IP-tuple or the second CID.

2. The method of claim 1, further comprising:
in response to determining that at least two connection criteria are not met, determining that the second QUIC connection does not correspond to the first QUIC connection; and
storing a second association between the first IP-tuple, the third IP-tuple, and the second CID associated with the second QUIC connection.

3. The method of claim 1, further comprising:
determining that the second IP address corresponds to the third IP address;
determining that the second port number corresponds to the third port number;
determining that the second CID does not correspond to the first CID; and
storing the second CID in a list of probable CIDs.

4. The method of claim 1, further comprising:
determining that the second IP-tuple is associated with a server name index (SNI) and wherein storing the first association includes storing an association with the SNI.

5. The method of claim 1, wherein the network device is a middlebox and is one of a firewall, a Network Address Translator (NAT), a content delivery network (CDN), a load balancer, a WAN optimizer, a cloud based gateway, a cloud based firewall, or a secure router.

6. The method of claim 1, further comprising:
receiving, by the network device, a QUIC packet;
determining, by the network device, a source IP-tuple, a destination IP-tuple, and a CID from the QUIC packet;
determining, by the network device, that the source IP-tuple, the destination IP-tuple, and the CID from the QUIC packet correspond to the first association associated with the first QUIC connection; and
transmitting the QUIC packet to a destination device associated with the destination IP-tuple.

7. The method of claim 1, further comprising:
receiving, by the network device, a QUIC packet;
determining, by the network device, a source IP-tuple, a destination IP-tuple, and a CID from the QUIC packet;
determining, by the network device, that the source IP-tuple, the destination IP-tuple, and the CID from the QUIC packet do not correspond to the first association associated with the first QUIC connection; and
dropping the QUIC packet.

8. A system comprising:
one or more processors; and
one or more non-transitory computer-readable media storing computer-executable instructions that, when executed by the one or more processors, cause the one or more processors to perform operations comprising:
identifying, by a network device, a first QUIC connection between a first device and a second device;
determining, from the first QUIC connection, a first IP-tuple including a first IP address and a first port number associated with the first device;
determining, from the first QUIC connection, a second IP-tuple including a second IP address and a second port number associated with the second device;
determining, from the first QUIC connection, a first connection identifier (CID) associated with the first QUIC connection;
storing a first association between the first IP-tuple, the second IP-tuple, and the first CID associated with the first QUIC connection;
identifying, by the network device, a second QUIC connection between the first device and another device;
identifying, from the second QUIC connection, the first IP-tuple, a second CID, and a third IP-tuple including a third IP address and a third port number;
determining whether at least two following connection criteria are met:
the second IP address corresponds to the third IP address;
the second port number corresponds to the third port number; or
the second CID corresponds to the first CID; and
in response to determining that at least two connection criteria are met, determining that the second QUIC connection and the first QUIC connection are a same QUIC connection, and updating the first association based at least in part on the third IP-tuple or the second CID.

9. The system of claim 8, further comprising:
in response to determining that at least two of the connection criteria are not met, determining that the second QUIC connection does not correspond to the first QUIC connection; and
storing a second association between the first IP-tuple, the third IP-tuple, and the second CID associated with the second QUIC connection.

10. The system of claim 8, further comprising:
determining that the second IP address corresponds to the third IP address;
determining that the second port number corresponds to the third port number;
determining that the second CID does not correspond to the first CID; and
storing the second CID in a list of probable CIDs.

11. The system of claim 8, further comprising:
determining that the second IP-tuple is associated with a server name index (SNI) and wherein storing the first association includes storing an association with the SNI.

12. The system of claim 11, further comprising:
determining that the third IP-tuple is associated with the SNI;
determining that the third IP-tuple corresponds to the second IP-tuple;
determining that the second QUIC connection corresponds to the first QUIC connection; and
updating the first association with the second CID.

13. The system of claim 8, wherein the network device a middlebox and is one of a firewall, a Network Address Translator (NAT), a content delivery network (CDN), a load balancer, or a WAN optimizer.

14. The system of claim 8, further comprising:
receiving, by the network device, a QUIC packet;
determining, by the network device, a source IP-tuple, a destination IP-tuple, and a CID from the QUIC packet;
determining, by the network device, that the source IP-tuple, the destination IP-tuple, and the CID from the QUIC packet correspond to the first association associated with the first QUIC connection; and
transmitting the QUIC packet to a destination device associated with the destination IP-tuple.

15. The system of claim 8, further comprising:
receiving, by the network device, a QUIC packet;
determining, by the network device, a source IP-tuple, a destination IP-tuple, and a CID from the QUIC packet;
determining, by the network device, that the source IP-tuple, the destination IP-tuple, and the CID from the QUIC packet do not correspond to the first association associated with the first QUIC connection; and
dropping the QUIC packet.

16. One or more non-transitory computer-readable media storing computer-executable instructions that, when executed by one or more processors, cause the one or more processors to perform operations comprising:
identifying, by a network device, a first QUIC connection between a first device and a second device;
determining, from the first QUIC connection, a first IP-tuple including a first IP address and a first port number associated with the first device;
determining, from the first QUIC connection, a second IP-tuple including a second IP address and a second port number associated with the second device;
determining, from the first QUIC connection, a first connection identifier (CID) associated with the first QUIC connection;
storing a first association between the first IP-tuple, the second IP-tuple, and the first CID associated with the first QUIC connection;
identifying, by the network device, a second QUIC connection between the first device and another device;

identifying, from the second QUIC connection, the first IP-tuple, a second CID, and a third IP-tuple including a third IP address and a third port number;
determining whether at least two following connection criteria are met:
  the second IP address corresponds to the third IP address;
  the second port number corresponds to the third port number; or
  the second CID corresponds to the first CID; and
in response to determining that at least two connection criteria are met, determining that the second QUIC connection and the first QUIC connection are a same QUIC connection, and updating the first association based at least in part on the third IP-tuple or the second CID.

17. The one or more non-transitory computer-readable media of claim 16, the operations further comprising:
in response to determining that at least two of the connection criteria are not met, determining that the second QUIC connection does not correspond to the first QUIC connection; and
storing a second association between the first IP-tuple, the third IP-tuple, and the second CID associated with the second QUIC connection.

18. The one or more non-transitory computer-readable media of claim 16, the operations further comprising:
determining that the second IP address corresponds to the third IP address;
determining that the second port number corresponds to the third port number;
determining that the second CID does not correspond to the first CID; and
storing the second CID in a list of probable CIDs.

19. The one or more non-transitory computer-readable media of claim 16, the operations further comprising:
receiving, by the network device, a QUIC packet;
determining, by the network device, a source IP-tuple, a destination IP-tuple, and a CID from the QUIC packet;
determining, by the network device, that the source IP-tuple, the destination IP-tuple, and the CID from the QUIC packet correspond to the first association associated with the first QUIC connection; and
transmitting the QUIC packet to a destination device associated with the destination IP-tuple.

20. The one or more non-transitory computer-readable media of claim 16, the operations further comprising:
receiving, by the network device, a QUIC packet;
determining, by the network device, a source IP-tuple, a destination IP-tuple, and a CID from the QUIC packet;
determining, by the network device, that the source IP-tuple, the destination IP-tuple, and the CID from the QUIC packet do not correspond to the first association associated with the first QUIC connection; and
dropping the QUIC packet.

* * * * *